(12) United States Patent
Andersen (10) Patent No.: US 10,829,142 B1
(45) Date of Patent: Nov. 10, 2020

(54) STEERING WHEEL SPINNER

(71) Applicant: Douglas E. Andersen, Santaquin, UT (US)

(72) Inventor: Douglas E. Andersen, Santaquin, UT (US)

( * ) Notice: Subject to any disclaimer, the term of this patent is extended or adjusted under 35 U.S.C. 154(b) by 0 days.

(21) Appl. No.: 16/749,493

(22) Filed: Jan. 22, 2020

(51) Int. Cl.
*B62D 1/04* (2006.01)
*B60R 21/203* (2006.01)

(52) U.S. Cl.
CPC ............ *B62D 1/043* (2013.01); *B60R 21/203* (2013.01); *B62D 1/046* (2013.01)

(58) Field of Classification Search
CPC ........ B62D 1/043; B62D 1/046; B60R 21/203
See application file for complete search history.

(56) References Cited

U.S. PATENT DOCUMENTS

| | | | | |
|---|---|---|---|---|
| 1,806,343 A * | 5/1931 | Geyer | ................... | B62D 1/043 74/557 |
| 2,168,961 A * | 8/1939 | Ragan | ................... | B62D 1/043 74/557 |
| 2,274,069 A * | 2/1942 | Johnson | ................ | B62D 1/043 74/557 |
| 2,305,527 A * | 12/1942 | Dunlap | .................. | B62D 1/043 74/557 |
| 2,432,262 A | 12/1947 | Thorp | | |
| 3,776,064 A * | 12/1973 | Rose | ...................... | B62D 1/043 74/557 |
| 4,618,143 A * | 10/1986 | Twardosz | ............ | A63B 21/0724 482/106 |
| 6,062,102 A * | 5/2000 | Jacoby | ..................... | B62D 1/04 74/494 |
| 6,564,897 B2 | 5/2003 | Dammeyer | | |
| 6,701,801 B1 * | 3/2004 | Wilson | ................... | B62D 1/043 280/778 |
| 10,377,411 B2 | 8/2019 | Aoki | | |
| 10,399,599 B2 | 9/2019 | Zegelaar et al. | | |
| 2003/0023353 A1 * | 1/2003 | Badarneh | ............... | B60K 35/00 701/1 |
| 2014/0008900 A1 * | 1/2014 | Onohara | ............... | B60R 21/203 280/731 |
| 2016/0001807 A1 * | 1/2016 | Hans | ..................... | B62D 1/046 345/173 |

FOREIGN PATENT DOCUMENTS

| CN | 201201638 Y | 3/2009 |
|---|---|---|
| CN | 206740403 U | 12/2017 |

(Continued)

OTHER PUBLICATIONS

Steering wheel circulator. Translation [online]. Google Patents [retrieved on Sep. 11, 2019]. Retrieved from the Internet: URL: <https://patents.google.com/patent/CN206740403U/en?q=steering+column&q=spinner&oq=steering+column+spinner&page=1>.

(Continued)

*Primary Examiner* — Vicky A Johnson
(74) *Attorney, Agent, or Firm* — Cramer Patent & Design, PLLC; Aaron R. Cramer (57) ABSTRACT

A steering wheel spinner is incorporated within an outer steering wheel. The spinner assembly is fashioned as an inner steering wheel secured within the circumference of the outer steering wheel. The inner steering wheel is capable of full 360° rotation relative thereto.

19 Claims, 5 Drawing Sheets

(56) References Cited

FOREIGN PATENT DOCUMENTS

CN          208233147 U     12/2018
GB            2445101 A   *   6/2008            E02F 9/2004

OTHER PUBLICATIONS

Steering wheel rotary device and steering wheel sheath equipped therewith. Translation [online]. Google Patents [retrieved on Sep. 11, 2019]. Retrieved from the Internet: URL: <https://patents.google.com/patent/CN201201638Y/en?q=steering+column&q=spinner&oq=steering+column+spinner>.

A kind of industrial vehicle with accurate steering adjustment structure. Translation [online]. Google Patents [retrieved on Sep. 11, 2019]. Retrieved from the Internet: URL: <https://patents.google.com/patent/CN208233147U/en?q=steering+column&q=spinner&oq=steering+column+spinner>.

* cited by examiner

STEERING WHEEL SPINNER

RELATED APPLICATIONS

None.

FIELD OF THE INVENTION

The present invention relates to a steering wheel spinner.

BACKGROUND OF THE INVENTION

Various vehicles such as trucks, tractors, forklifts and the like are frequently operated and used while being turned. As such, these vehicles are frequently equipped with a "spinner knob" that is located on the radius of the steering wheel and can be gripped to allow for easier turning and steering of the vehicle in a rapid manner.

While such spinner knobs have worked well for decades, they are not without their disadvantage. They can difficult to grip especially in extreme weather conditions with or without wearing gloves. They can be somewhat uncomfortable to hold especially when extremely close to one's body or farthest away (bottom and top respectively). Finally, and perhaps most importantly, they pose a danger of becoming caught in the driver's clothing where they pose a safety hazard to not only the driver of the equipped vehicle, but anyone who shares the road with them.

Accordingly, there exists a need for a means by which spinner knobs can be modified or enhanced in order to address the concerns as described above. The development of the steering wheel spinner fulfills this need.

BRIEF SUMMARY OF THE INVENTION

The principles of the present invention provide for a steering wheel spinning device, comprising a spinning assembly which is located immediately inboard of the outer perimeter of a steering wheel rim, a recessed area which is provided within the spinning assembly to facilitate grabbing by a person with any sized hands, a plurality of finger grooves facilitating slip-proof gripping of a cross bar which have a first end and a second end, a center support shaft which is from the middle of the cross bar and penetrating an inner semispherical shape and an interstitial space between the inner semispherical shape and an outer semispherical shape which is filled with a solid material. The cross bar is attached at each of the ends across the steering wheel.

The steering wheel spinning device may allow for easy and quicker turning of the steering wheel in a manner with reduced ergonomic stresses on the driver. The position of person's hands on the outer perimeter of the steering wheel rim may be an eight-o-clock position when the steering wheel is in its normal position. The position of the outer perimeter of the steering wheel rim may be for grabbing with either a person's right hand or a person's left hand in a first position. The steering wheel may be equipped with one or more air bags, one or more horn controls, one or more various switches for cruise control, and one or more infotainment systems without interference from the spinning assembly.

The spinning assembly may have a complete range of rotational movement as defined by a 360-degree travel path. The spinning assembly may be provided with a steering wheel that is in the range of five to six inches wide. Each of the ends of the cross bar may be provided with a bearing outer ring. Each of the bearing outer rings may facilitate easy turning of the cross bar within an inner semispherical shape. An upper end of the inner semispherical shape may be provided with a pair of lock point dogs that engage each of a plurality of corresponding detents. The center support shaft may be mechanically anchored to an outer semispherical shape by a keeper ring. The corresponding detents may include twelve detents. A lower end of the center support shaft may be provided with a radial protrusion that engages a matching latching mechanism that allows the person to pull up along an outward travel path to disengage the cross bar from the detents and allow the cross bar to spin freely about three-hundred-sixty degrees. The person may push the cross bar along an inward travel path where the cross bar will lock the cross bar into one of six equally spaced positions.

The detents may be located at thirty degrees to each other such that opposing detents are engaged by the lock point dogs to sit flush when the lock point dogs are engaged with the detents and stand-up when sitting upon the flush surface. The solid material may be metal or non-metal. The steering wheel spinning device may further comprise flush surface and the associated detents located about the upper perimeter of the inner semispherical shape and surrounding the recessed area. The outer semispherical shape and the flush surface may be in mechanical communication with the steering wheel support frame attached to a hub. The steering wheel spinning device may also comprise a steering wheel center façade placed over and attached to the steering wheel support frame.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
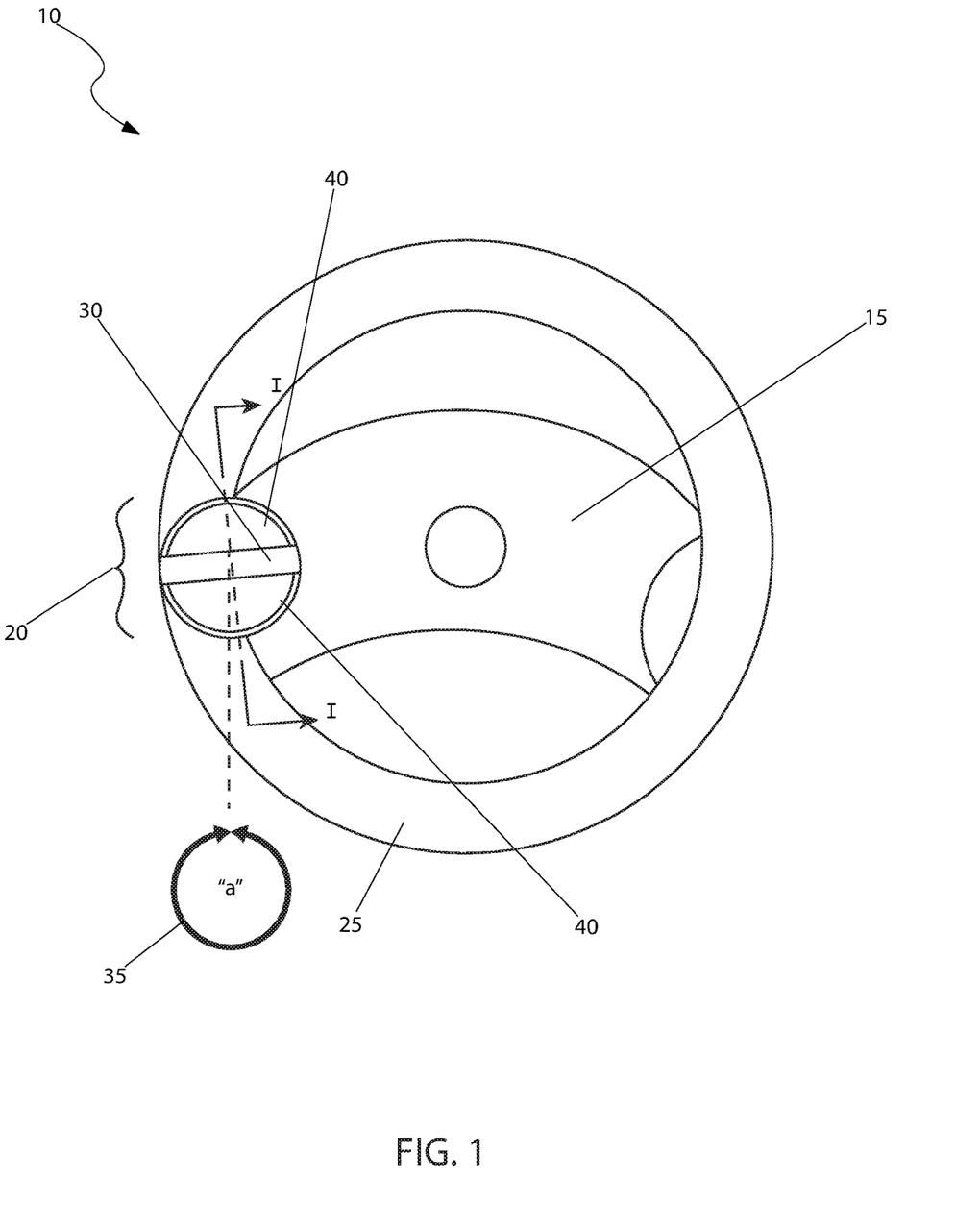
FIG. 1 is a top view of a steering wheel spinning device 10, installed upon a steering wheel 15, according to the preferred embodiment of the present invention.

Referring now to FIG. 1, a top view of the steering wheel spinning device 10, according to the preferred embodiment of the present invention is disclosed. The steering wheel spinning device 10 (herein also described as the "device") 10, includes a spinning assembly 20 located immediately inboard of the outer perimeter of the steering wheel rim 25 at approximately the eight-o-clock (8:00) position when the steering wheel 15 is at its normal or home position. The spinning assembly 20 is provided with a that is approximately five to six inches (5-6 in.) wide and is suitable for grabbing with either the right or left hand in a first position. The steering wheel 15 may be used on any type of vehicle, including but not limited to tractors, forklifts, tractor trailers, busses, motorhomes, backhoes, vans, SUV's, ATV's, pickup trucks, sedans, or the like. The steering wheel 15 may also be equipped with air bags, horn control, various switches for cruise control and infotainment systems and the like without interference from the spinning assembly 20. During utilization, the spinning assembly 20 has a complete range of rotational movement as defined by a 360-degree travel path "a" 35. It is envisioned that usage of the device 10 allows for easy and quicker turning (movement) of the steering wheel 15 in a manner with reduced ergonomic stresses on the driver. A recessed area 40 is provided within the spinning assembly 20 (on either side of and under the cross bar 30) to facilitate grabbing by the largest of hands, even with gloves on. Further explanation of this recessed area 40 will be provided herein below.

Figure 2:
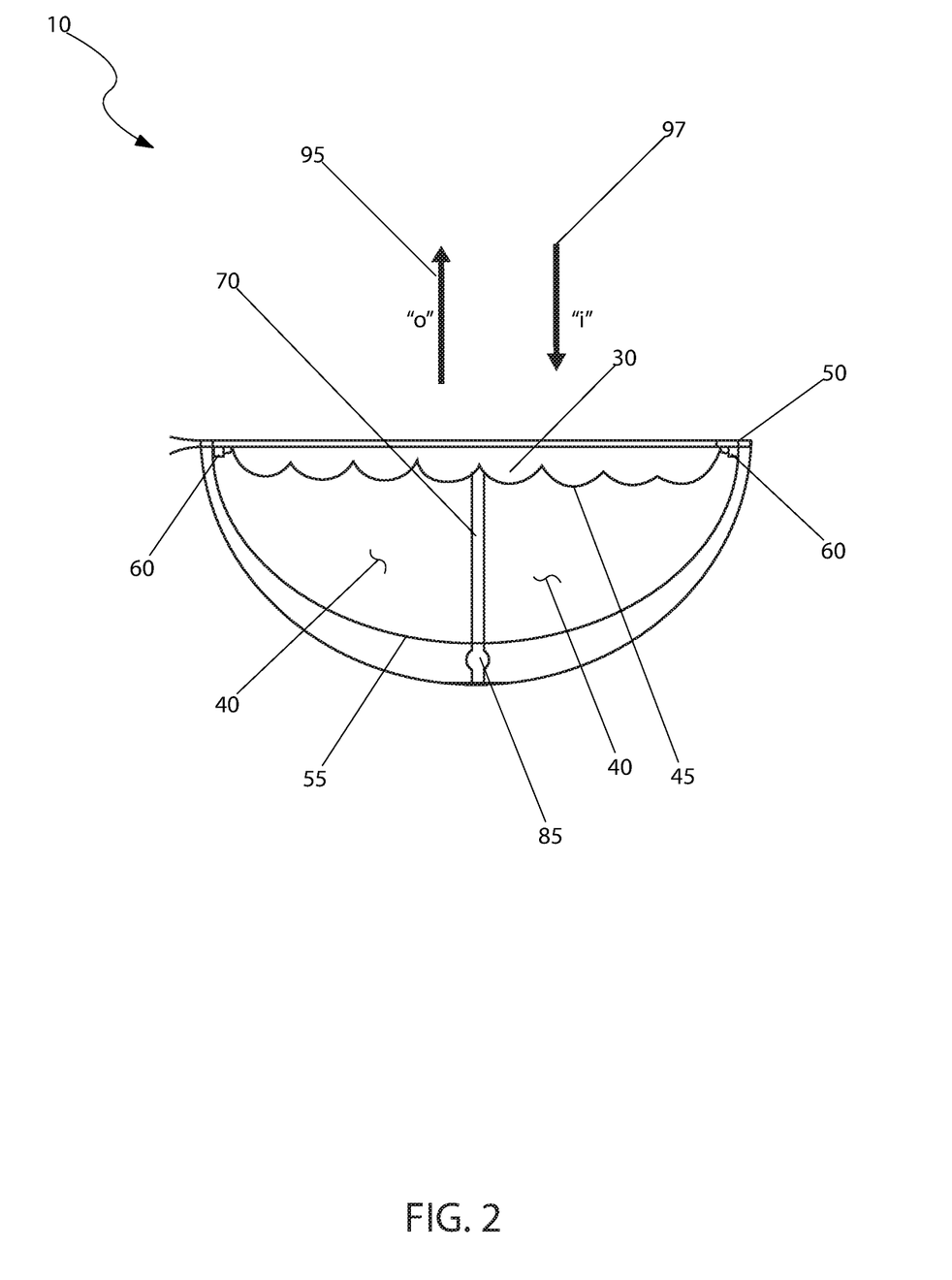
FIG. 2 is a sectional view of the steering wheel spinning device 10, as seen along a line I-I, as shown in FIG. 1, according to the preferred embodiment of the present invention.

Referring next to FIG. 2, a sectional view of the device 10, as seen along a line I-I, as shown in FIG. 1, according to the preferred embodiment of the present invention is depicted. This view clearly identifies the recessed area 40 located under the cross bar 30. A set of finger grooves 45 facilitate slip-proof gripping of the cross bar 30. The distal ends of the cross bar 30 are provided with a bearing outer ring 50 (one (1) at each end for a total of two (2)). The bearing outer ring 50 facilitate easy turning of the cross bar 30 within an inner semispherical shape 55. The upper end of the inner semispherical shape 55 is provided with two (2) lock point dogs 60 that engage corresponding detents 65 (not shown in this FIGURE). The total number of detents 65 is twelve (12) and will be further illustrated herein below. A center support shaft 70 extends from the middle of the cross bar 30 and penetrates the inner semispherical shape 55 where it is mechanically anchored to an outer semispherical shape 75 by a keeper ring 80. The lower end of the center support shaft 70 is provided with a radial protrusion 85 that engages a matching latching mechanism 90. This feature allows the user (driver) to pull up along an outward travel path "o" 95 to disengage the cross bar 30 from the detents 65 and allow the cross bar 30 to spin freely about three-hundred-sixty degrees (360°) as shown by the 360 degree travel path "a" 35 (a shown in FIG. 1). The user can also push the cross bar 30 along an inward travel path "i" 97 where the cross bar 30 (with the aid of the lock point dogs 60 and matching detents 65) will lock the cross bar 30 into one (1) of six (6) equally spaced positions.

Figure 3:
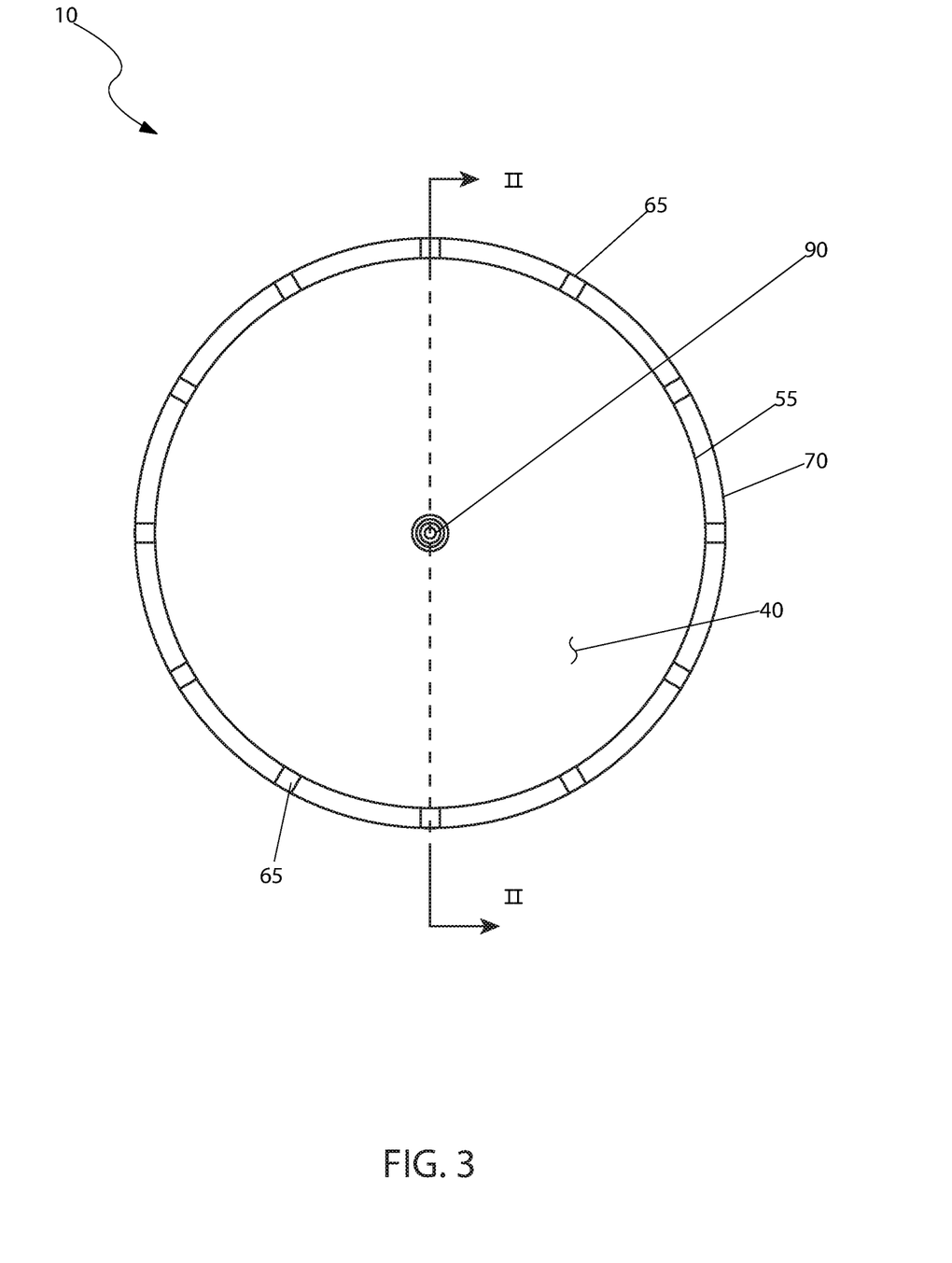
FIG. 3 is a top view of the inner semispherical shape 55, as used with the steering wheel spinning device 10, according to the preferred embodiment of the present invention.

Referring now to FIG. 3, a top view of the inner semispherical shape 55, as used with the device 10, according to the preferred embodiment of the present invention is shown. The inner semispherical shape 55 is located inward of the outer semispherical shape 75. A flush surface 100 is located between each detent 65. The detents 65 are located approximately thirty degrees (30°) to each other such that opposing detents 65 are engaged by the lock point dogs 60 (as shown in FIG. 2). This arrangement allows the cross bar 30 (as shown in FIG. 2) to sit flush when the lock point dogs 60 are engaged with the detents 65 and stand proud when sitting upon the flush surface 100. The latching mechanism 90 is located at the center of the inner semispherical shape 55.

Figure 4:
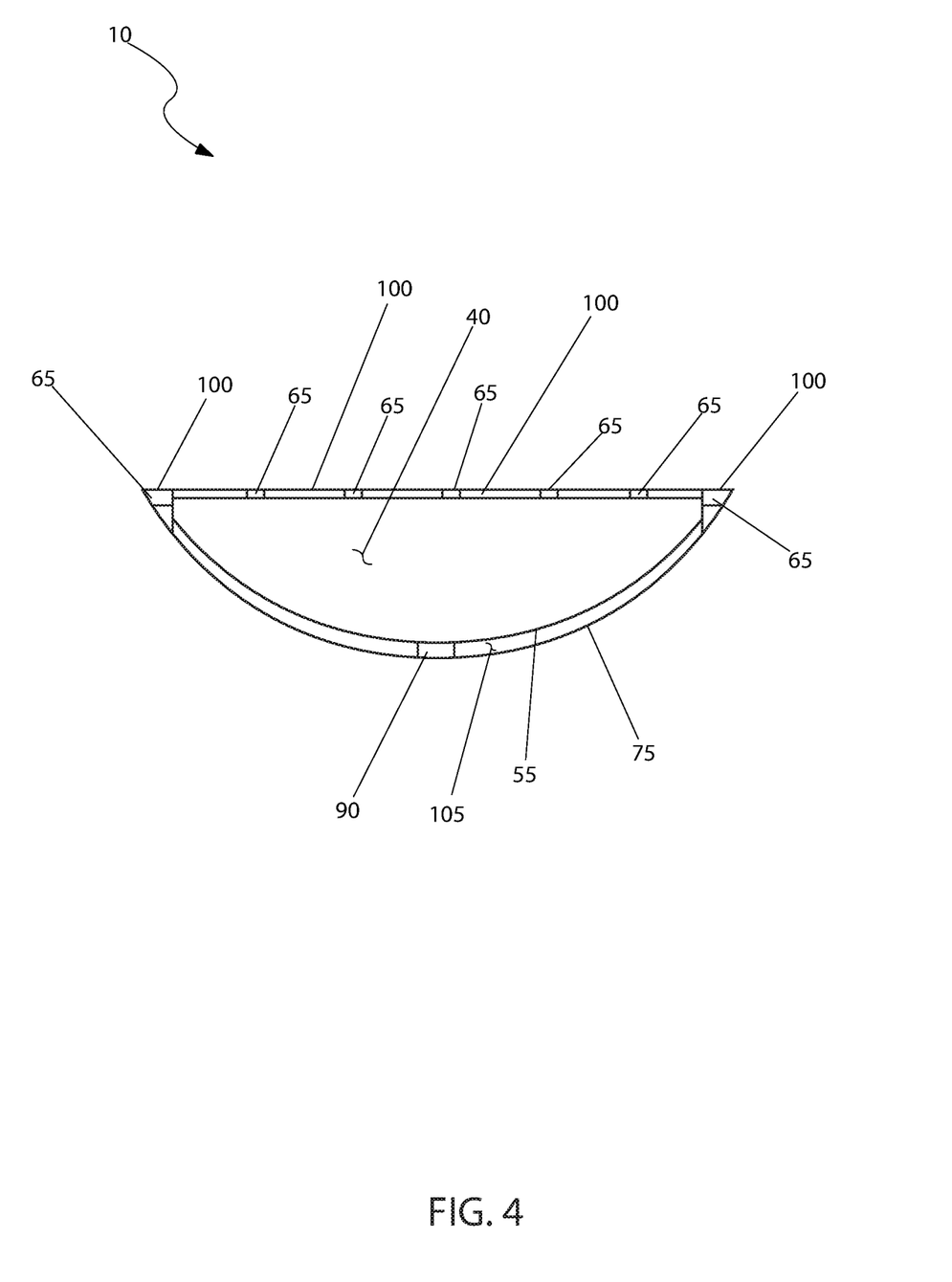
FIG. 4 is a sectional view of the inner semispherical shape 55, as seen along a line II-II, as shown in FIG. 3, according to the preferred embodiment of the present invention; and, FIG. 5 is a cross-sectional view of the steering wheel spinning device 10, according to the preferred embodiment of the present invention.

Referring next to FIG. 4, a sectional view of the inner semispherical shape 55, as seen along a line II-II, as shown in FIG. 3, according to the preferred embodiment of the present invention is disclosed. This view provides additional clarification on the construction between the inner semispherical shape 55 and the outer semispherical shape 75. The interstitial space 105 between said inner semispherical shape 55 and the outer semispherical shape 75 may be hollow or filled with solid material such as metal or plastic. The latching mechanism 90 is located at the lowest midpoint of this structure. The flush surface 100 and the associated detents 65 are located about the upper perimeter of the inner semispherical shape 55, surrounding the recessed area 40.

Figure 5:
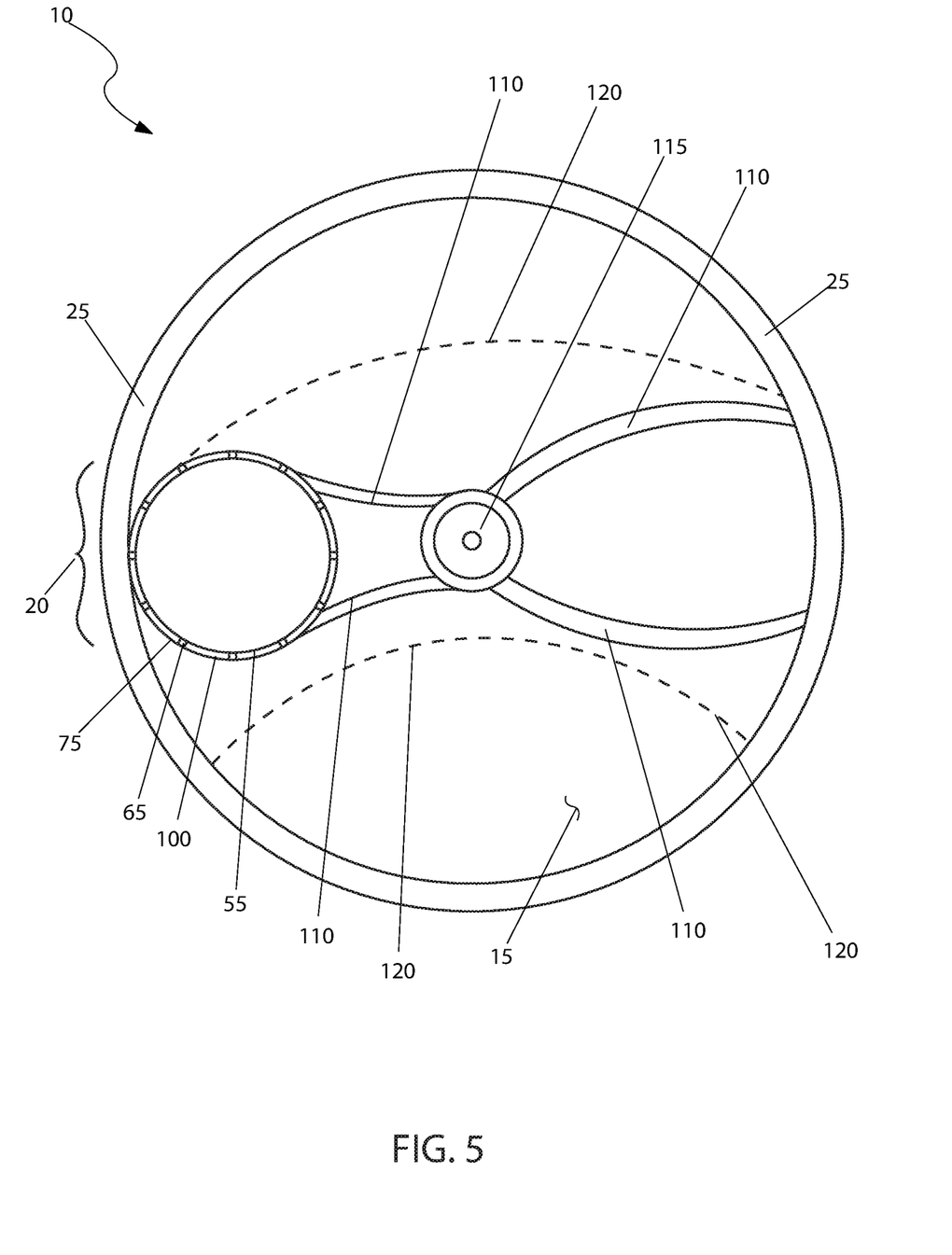

Referring to FIG. 5, a cross-sectional view of the device 10, according to the preferred embodiment of the present invention is depicted. The spinning assembly 20, herein depicted by the inner semispherical shape 55, the detents 65. The outer semispherical shape 75, and the flush surface 100, are in mechanical communication with the steering wheel support frame 110, as attached to the hub 115. The distal or outer end of the steering wheel support frame 110 is connected to the steering wheel rim 25 in a customary manner. A steering wheel center facade 120, herein depicted by dashed lines, is placed over and attached to the steering wheel support frame 110 in a customary manner. The steering wheel center facade 120 may hold with air bags, horn control, various switches for cruise control and infotainment systems and the like. The location of the spinning assembly 20 at the outward portion of the steering wheel 15 near the steering wheel rim 25 provides the greatest leverage for the spinning assembly 20 when acting upon the steering wheel 15. Additionally, the greater travel distance around the steering wheel rim 25 allows for more precise positioning or control.

2. Operation of the Preferred Embodiment

The preferred embodiment of the present invention can be utilized by the common user in a simple and effortless manner with little or no training. It is envisioned that the device 10 would be constructed in general accordance with FIG. 1 through FIG. 5. The user would procure the device 10 as a standard or optional component on a new vehicle such as tractors, forklifts, tractor trailers, busses, motorhomes, backhoes, vans, SUV's, ATV's, pickup trucks, sedans, or the like. It is also envisioned that the device 10 would be made available as a component of an aftermarket steering wheel 15 from auto parts stores, agricultural supply houses, mail order and internet supply houses and the like. Special attention would be paid to the overall size of the steering wheel 15 with the included device 10 and mechanical compatibility with the intended usage vehicle.

During utilization of the device 10, the following procedure would be initiated: under normal usage, the user would utilize the steering wheel 15 in a normal, conventional and transparent manner; the steering wheel rim 25 may be gripped by the hands of the user to control the steering of the vehicle in a conventional manner; should high speed, precise, and/or repetitive steering be required, the user may grab the cross bar 30 with one (1) hand and pull up along the outward travel path "o" 95 to disengage the lock point dogs 60 from the detents 65, while simultaneously disengaging the protrusion 85 from the latching mechanism 90; at this point in time, the cross bar 30 is free to move about on the bearing outer ring 50 in a 360 degree travel path "a" 35 to facilitate such movement; When finished with such steering motions, the user may push the cross bar 30 back along the inward travel path "i" 97 to engage the desired detents 65 with the associated lock point dogs 60; this position is then secured by the subsequent physical engagement of the protrusion 85 with the latching mechanism 90; the use of the device 10 is similar to that experienced by a conventional spinner knob, but without the continuous extension of the spinner knob above the plane of the steering wheel 15; this lack of extension is viewed as beneficial as it will not interfere with normal arm movements, catch on clothing, or the like.

The use of the steering wheel spinning device 10 is viewed as providing the following benefits: use with handicapped individuals whose arm movement or strength is limited, effectively reduces the diameter of the steering wheel turn radius, maintains contact with hand and thus control at all times (elimination of hand over hand steering), lack of protrusion into space above the steering wheel 15, and eliminates the tendency to catch on jackets, coats, sleeves and other types and components of clothing.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. contemplated.

The invention claimed is:

1. A steering wheel spinning device, comprising:
a spinning assembly located immediately inboard of the outer perimeter of a steering wheel rim;
a recessed area provided within the spinning assembly to facilitate grabbing by a person with any sized hands;
a plurality of finger grooves facilitating slip-proof gripping of a cross bar having a first end and a second end, the cross bar is attached at each of the ends across a steering wheel;
a center support shaft extending from the middle of the cross bar and penetrating an inner semispherical shape; and
an interstitial space between the inner semispherical shape and an outer semispherical shape filled with a solid material.

2. The steering wheel spinning device, according to claim 1, wherein the steering wheel spinning device allows for easy and quicker turning of the steering wheel in a manner with reduced ergonomic stresses on the driver.

3. The steering wheel spinning device, according to claim 1, wherein the position of person's hands on the outer perimeter of the steering wheel rim is an eight-o-clock position when the steering wheel is in its normal position.

4. The steering wheel spinning device, according to claim 1, wherein the position of the outer perimeter of the steering wheel rim is for grabbing with either a person's right hand or a person's left hand in a first position.

5. The steering wheel spinning device, according to claim 1, wherein the spinning assembly has a complete range of rotational movement as defined by a 360-degree travel path.

6. The steering wheel spinning device, according to claim 1, wherein the spinning assembly is provided with the steering wheel that is in the range of five to six inches wide.

7. The steering wheel spinning device, according to claim 1, wherein each of the ends of the cross bar are provided with a bearing outer ring.

8. The steering wheel spinning device, according to claim 7, wherein each of the bearing outer rings facilitates easy turning of the cross bar within an inner semispherical shape.

9. The steering wheel spinning device, according to claim 8, wherein an upper end of the inner semispherical shape is provided with a pair of lock point dogs that engage each of a plurality of corresponding detents.

10. The steering wheel spinning device, according to claim 9, wherein the center support shaft is mechanically anchored to an outer semispherical shape by a keeper ring.

11. The steering wheel spinning device, according to claim 9, wherein the plurality of corresponding detents includes twelve detents.

12. The steering wheel spinning device, according to claim 11, wherein the plurality of detents are located thirty degrees to each other such that opposing detents are engaged by a lock point dogs to sit flush when the lock point dogs are engaged with the detents and stand-up when sitting upon a flush surface.

13. The steering wheel spinning device, according to claim 12, further comprising the flush surface and the plurality of corresponding detents located about an upper perimeter of the inner semispherical shape and surrounding the recessed area.

14. The steering wheel spinning device, according to claim 13, wherein the outer semispherical shape and the flush surface are in mechanical communication with a steering wheel support frame attached to a hub.

15. The steering wheel spinning device, according to claim 14, further comprising a steering wheel center façade placed over and attached to the steering wheel support frame.

16. The steering wheel spinning device, according to claim 1, wherein a lower end of the center support shaft is provided with a radial protrusion that engages a matching latching mechanism that allows the person to pull up along an outward travel path to disengage the cross bar from the detents and allow the cross bar to spin freely about three-hundred-sixty degrees.

17. The steering wheel spinning device, according to claim 1, wherein the person pushes the cross bar along an inward travel path where the cross bar will lock the cross bar into one of six equally spaced positions.

18. The steering wheel spinning device, according to claim 1, wherein the solid material is metal.

19. The steering wheel spinning device, according to claim 1, wherein the solid material is non-metal.

* * * * *